(12) United States Patent
Asahara et al.

(10) Patent No.: US 9,596,804 B2
(45) Date of Patent: Mar. 21, 2017

(54) RIDING MOWER

(71) Applicant: KUBOTA CORPORATION, Osaka (JP)

(72) Inventors: Masato Asahara, Osaka (JP); Hideya Umemoto, Osaka (JP); Osami Fujiwara, Osaka (JP); Hideki Aoki, Sakai (JP); Akira Minoura, Osaka (JP); Yoshikazu Togoshi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 7 days.

(21) Appl. No.: 14/640,496

(22) Filed: Mar. 6, 2015

(65) Prior Publication Data

US 2016/0057924 A1 Mar. 3, 2016

(30) Foreign Application Priority Data

Aug. 27, 2014 (JP) ................. 2014-173001

(51) Int. Cl.
| | |
|---|---|
| *A01D 34/64* | (2006.01) |
| *B60R 21/13* | (2006.01) |
| *B62D 1/18* | (2006.01) |
| *B62D 49/00* | (2006.01) |
| *B60K 1/00* | (2006.01) |
| *B60K 1/02* | (2006.01) |
| *B62D 21/18* | (2006.01) |
| *A01D 67/00* | (2006.01) |
| *B60K 7/00* | (2006.01) |
| *B60K 5/00* | (2006.01) |

(52) U.S. Cl.
CPC .............. *A01D 34/64* (2013.01); *A01D 67/00* (2013.01); *B60K 1/00* (2013.01); *B60K 1/02* (2013.01); *B60R 21/131* (2013.01); *B62D 21/186* (2013.01); *B62D 49/00* (2013.01); *B60K 7/00* (2013.01); *B60K 2005/006* (2013.01); *B60Y 2200/223* (2013.01)

(58) Field of Classification Search
CPC ...... B62D 21/186; B62D 21/12; B62D 49/00; B62D 49/0664; B62D 49/002; B60R 21/13; B60R 21/131; A01D 67/00; A01D 34/64
USPC .......................................... 280/756
See application file for complete search history.

(56) References Cited

U.S. PATENT DOCUMENTS

| | | | |
|---|---|---|---|
| 8,424,911 B2* | 4/2013 | Alexander, IV ...... | B60R 21/131 16/375 |
| 2007/0169455 A1* | 7/2007 | Umemoto .............. | A01D 34/66 56/14.7 |
| 2008/0302076 A1* | 12/2008 | David ................... | A01D 34/64 56/16.7 |

(Continued)

FOREIGN PATENT DOCUMENTS

JP 2004-236641 8/2004

*Primary Examiner* — Ruth Ilan
(74) *Attorney, Agent, or Firm* — Greenblum & Bernstein, P.L.C.

(57) ABSTRACT

A riding mower is provided with a front frame, a rear frame on which a drive unit is mounted, a rollover protective structure (ROPS). A first coupling part couples one front frame and one rear frame. A second coupling part couples a rear end of the front frame and a supporting column of the ROPS. A third coupling part couples the supporting column and the rear frame. The riding mower utilizes at least one triangular structural element defined in part by the first, second and third coupling parts.

23 Claims, 9 Drawing Sheets

(56) References Cited

U.S. PATENT DOCUMENTS

2012/0227369 A1* 9/2012 Koike .................... A01D 69/02
                                                         56/10.2 A
2014/0109535 A1* 4/2014 Spitz .................... B60K 15/073
                                                         56/14.7

* cited by examiner

RIDING MOWER

CROSS-REFERENCE TO RELATED APPLICATIONS

The present application claims priority under 35 U.S.C. §119 of Japanese Application No. 2014-173001, filed on Aug. 27, 2014, the disclosure of which is expressly incorporated by reference herein in its entirety.

BACKGROUND OF THE INVENTION

1. Field of the Invention

The present invention relates to a riding mower equipped with a vehicle frame that is supported on the ground by a pair of left and right front wheels, and a pair of left and right rear wheels; and an operating unit and a drive unit mounted on the frame.

2. Description of Related Art

The riding mower described in Japanese Patent Laid-open Publication 2004-236641 is provided with a front frame, a rear frame, and an engine mounting frame included in the vehicle frame. The rear end of the front frame, and the front end of the rear frame are coupled via a coupling bracket, while the rear end of the rear frame is coupled to the engine mounting frame with the rear-wheel drive unit (a type of transmission) acting as a mediating structural element. In addition, to secure the supporting columns in the rollover protective structure (ROPS), a supporting column base part is provided on the rearward frame. In this kind of frame structure, the frontward frame, the rearward frame, the rear-wheel drive unit, and the engine mounting frame are connected in this order lengthwise along the vehicle body. The rear-wheel drive unit is built into the frame structure as a mediating structural element and therefore the coupling structure is complicated.

Given the above described circumstances, what is desirable is a riding mower where the rigidity of the vehicle frame is reinforced without having to use the transmission housing and the like directly as configuration elements in the frame structure.

SUMMARY OF THE INVENTION

A riding mower according to aspects of the invention is equipped with a pair of left and right front frames extending lengthwise along the vehicle body; a front frame crossbeam unit coupling the front frames; a pair of left and right rear frames extending rearward from the front frames lengthwise along the vehicle body; a rear frame crossbeam unit coupling the rear frames; a rollover protective structure including a pair of left and right supporting columns; a pair of left and right front wheels each provided in a front end region of the front frame; a pair of left and right rear wheels each provided in a middle region of the rear frame; an operating unit formed above the front frames; and a drive unit mounted on the rear frames. The riding mower is further provided with a first coupling part coupling the front frame and the rear frame; a second coupling part coupling the rear end of the front frame and the supporting column; a third coupling part coupling the supporting column and the rear frame; and a triangular structural element shaped as a triangle in a side view and formed by a rear portion on the front frame defined by the first coupling part and the second coupling part; a leg on the supporting column defined by the second coupling part and the third coupling part; and a front portion on the rear frame defined by the first coupling part and the third coupling part.

With this configuration, a base structure for the riding mower is formed from the front frame, the rear frame, and the rollover protective structure, as the front frame, the rear frame, and the rollover protective structure are coupled to one another by a first coupling part, a second coupling part, and a third coupling part. At that point, the rear portion of the front frame and the legs of the supporting columns of the rollover protective structure (ROPS), and the front portion of the rear frame form a triangular structural element. The rear portion of the front frame, the leg of the supporting column of the ROPS, and the front portion of the rear frame form the three sides of the triangle with the first coupling part, the second coupling part, and the third coupling part forming the vertices of the triangle. As is well known, a triangular structural element is extremely resistive to external pressure, and the rigidity of the vehicle frame structure of the riding mower according to the present invention is thusly reinforced.

Another aspect of the invention may be configured such that the front frame and rear frame are separable lengthwise along the vehicle body by decoupling the first coupling part and the second coupling part. For instance, when a bolted connection type configuration is used at the first coupling part and the second coupling part, the front frame may be detached and separated from the rear frame and the ROPS. Consequently, this facilitates maintenance of the drive unit mounted on the rear frame.

Another aspect of the invention may be configured such that the front portion of the rear frame is located below the rear portion of the front frame. The engine and transmission mounted to the rear frame are heavy objects; therefore, lowering the center of gravity of the engine and transmission as much as possible contributes to the stability of the vehicle. Adopting a configuration whereby the rear frame is tucked under the front frame thereby facilitates lowering of the gravity center of the drive unit mounted on the rear frame.

A mower unit with a wide mowing width is attached to the front frame to improve the mowing efficiency. Therefore, it is preferable that there is a large width between the left and right front frames. Thus, an aspect of the invention may be configured such that the transverse width of the vehicle body defined by the pair of left and right rear frames is narrower than the width defined by the pair of left and right front frames, and the pair of left and right rear frames fits within the width between the pair of left and right front frames.

Another aspect of the invention may be configured such that a step is provided in the front region of the front frame, and a driver seat is provided on a seat support in the rear region of the front frame. Providing a step in the front region of the front frame thus reinforces the strength of the front region of the front frame. In addition, the seat support reinforces the strength of the rear region of the front frame.

Another aspect of the invention may be configured such that the drive unit is configured by an engine and a transmission. At that point, a rear-axle transmission unit which extends from the transmission in the transverse direction of the vehicle and transmits power to the rear wheels preferably passes through an opening in the triangular structural element, and the rear-axle transmission unit is preferably supported on the triangular structural element. With this configuration, the rear-axle transmission unit which extends from the transmission to the rear wheels can be effectively supported on the extremely strong triangular structural element, to improve the stability of the vehicle body.

Another aspect of the invention may be configured such that the transmission is supported on the front portion of the rear frame, and the engine is supported on a portion of the rear frame located behind the front portion of the rear frame. Thus, the engine, which compared to the transmission outputs a large amount of sound and heat, may be located rearward in the vehicle body, far away from the operating unit. Thereby improving the operating environment in the operating unit.

Another aspect of the invention may be configured such that the drive unit is an electric motor unit. In that case, a single electric motor may replace the engine and the power therefrom distributed to left and right drive wheels; alternatively, a pair of left and right electric motors may be provided to drive the left and right drive wheels independently, thereby taking advantage of the compactness of and the ease of speed change in an electric motor. The electric motor may be supported on the triangular structural element and arranged such that the rotational axis center of the electric motor passes through an opening in the triangular structural element, to thereby shorten the vehicle body lengthwise in particular, thus making the vehicle body more compact.

Another aspect of the invention may be configured such that the axle for the rear wheels (rear axle) passes through an opening in the triangular structural element. Therefore, the rear axle may be stably supported with a support member having a simple structure. Finally, yet another aspect of the invention may be configured such that the axle for the rear wheels passes behind an opening in the triangular structural element. Thus, it is possible to increase the distance between the front wheels and the rear wheels to thereby mount a large mower unit therebetween.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
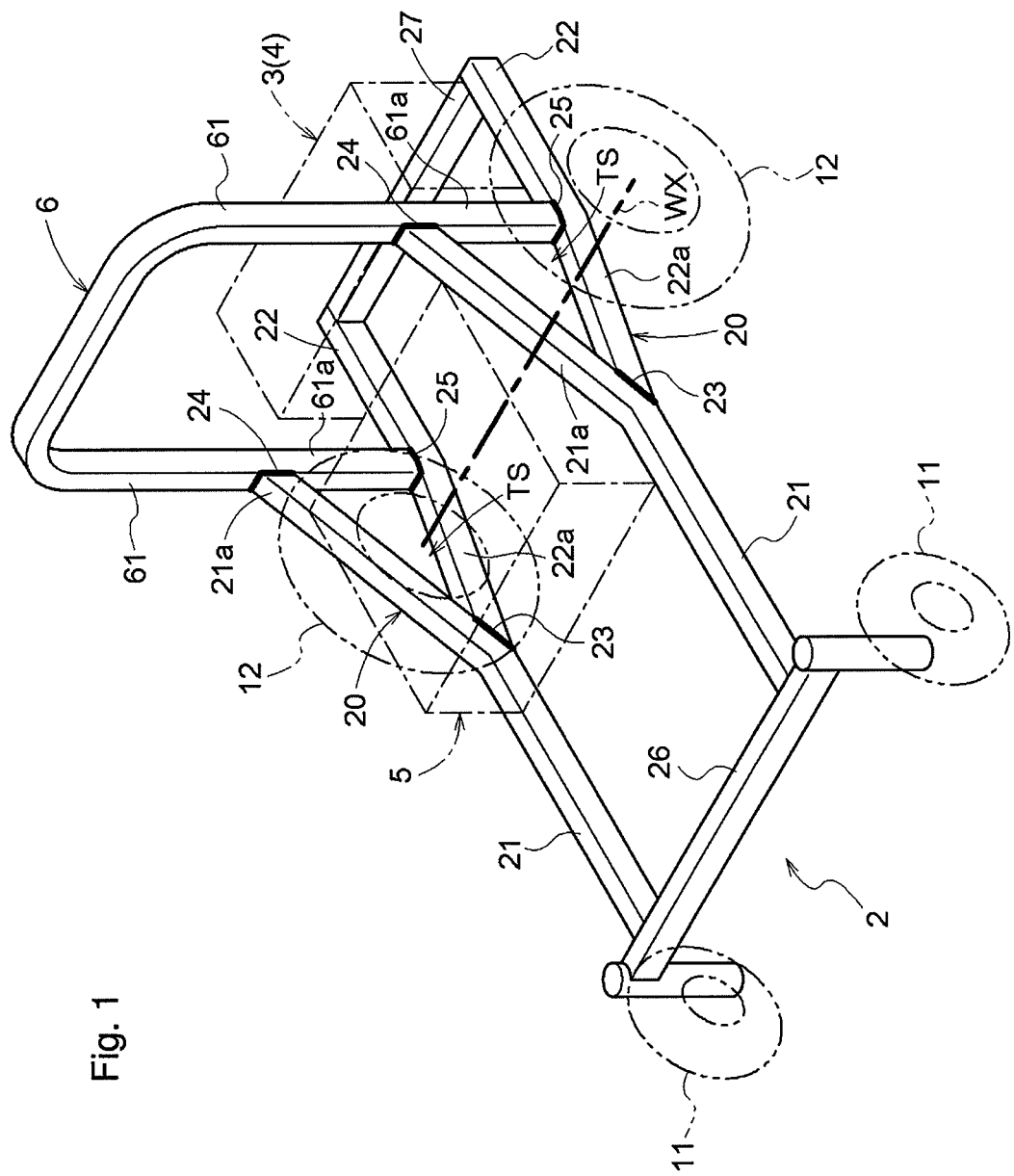
FIG. 1 is a schematic view for explaining the basic configuration of the present invention.

Before describing a riding mower according to specific embodiments of the invention, the basic configuration of a riding mower having features of the invention is described using FIG. 1. The vehicle frame 2 of a riding mower includes a pair of left and right front frames 21 extending lengthwise along the vehicle body, and a pair of left and right rear frames 22 extending rearward from the front frames 21 and lengthwise along the vehicle body. The pair of left and right front frames 21 are coupled by a front crossbeam unit 26 configured with at least one crossbeam. Similarly, the pair of left and right rear frames 22 are coupled by a rear crossbeam unit 27 configured with at least one crossbeam. Finally, the pair of left and right supporting columns 61 in the ROPS 6 rise from the rear frames 22.

A respective front frame 21 and a respective rear frame 22 are coupled together by a first coupling part 23; the rear end of the front frame 21 and a supporting column 61 are coupled together by a second coupling part 24; and the supporting column 61 and the rear frame 22 are coupled together by a third coupling part 25. The first coupling part 23, the second coupling part 24, and the third coupling part 25 may be coupled by a permanent connection such as through welding, or may be an attachable and removable connection such as a through bolted connection. In any case, the coupling of these parts utilize a rear portion 21a on the front frames 21 defined by the first coupling part 23 and the second coupling part 24, a leg 61a on the supporting column 61 defined by the second coupling part 24 and the third coupling part 25, and a front portion 22a on the rear frames 22 defined by the first coupling part 23 and the third coupling part 25, which in turn generally forms a triangular structural element 20 which resembles a triangle in a side view. An opening TS is thus formed in the triangular structural element 20 passing through the transverse direction of the vehicle body and enclosed by the rear portion 21a, the leg 61a, and the front portion 22a. The opening TS has a substantially triangular cross-section as is apparent in FIG. 1. Despite that, assuming the first coupling part 23, the second coupling part 24, and the third coupling part 25 are connection points, the triangular structural element 20 merely forms a triangle when each of the connection points are connected with a straight line. Moreover, the cross-section of the opening TS does not necessarily need to be a triangle or triangular.

The triangular structural element 20 formed by the front frame 21, the rear frame 22, and the supporting column 61 of the ROPS 6 reinforces the strength of the vehicle frame 2.

Although merely alluded to by the dotted lines in FIG. 1, an engine 3 and a transmission 4 exemplifying a drive unit are mounted on the rear frames 22, a pair of left and right front wheels 11 are provided in the front end region of the front frames 21, and a pair of left and right rear wheels 12 are provided in the middle region of the rear frames 22. Additionally, an operating unit 5 is provided above the front frames 21. When heavy objects such as the engine 3 and the transmission 4 are mounted on the rear frames 22, it is advantageous for the rear frames 22 to be low, as the center of gravity of the vehicle will also be low. Therefore, in the example illustrated in FIG. 1, the front portion 22a of the rear frames 22 is coupled to the rear portion 21a of the front frames 21 so that the rear frames 22 are located below the front frames 21. That is, the front portions 22a of the rear frames 22 configure the lower side of each triangular structural element 20. The transmission 4 is also supported on the front portion 22a of the rear frames 22, and the engine 3 is supported on a portion located behind the front portion 22a of the rear frames 22.

Although in FIG. 1 only the axle of the rear wheels 12 (rear axle) WX is illustrated, the rear wheels 12 are arranged outside of the triangular structural elements 20 on both the left and the right sides. The rear axle WX passes through the opening TS of each triangular structural element 20; however, using a vertical transmission mechanism and the like at the end thereof, the rotational center of the rear wheels 12 may be separated from the opening TS. For example, in the embodiment illustrated in FIG. 5 (described later in detail), a rear-axle transmission unit extending from the transmission 4 in the transverse direction of the vehicle body and transmitting power to the rear wheels 12, passes through the opening TS in the triangular structural element 20 and extends rearward at the outside of the opening TS. The rear-axle transmission unit is actually supported by the triangular structural element 20. The rotational center of the rear wheels 12 is however located behind the opening TS.

While not illustrated in FIG. 1, a mower unit 13 acting as a mowing device having a width substantially equal to the tread width of the rear wheels 12 can be suspended from the front frames 21. Therefore, the width in the transverse direction of the vehicle body defined by the pair of left and right rear frames 22 is narrower than the width defined by the pair of left and right front frames 21, and in plan view the pair of left and right rear frames 22 are located between the pair of left and right front frames 21.

Figure 2A:
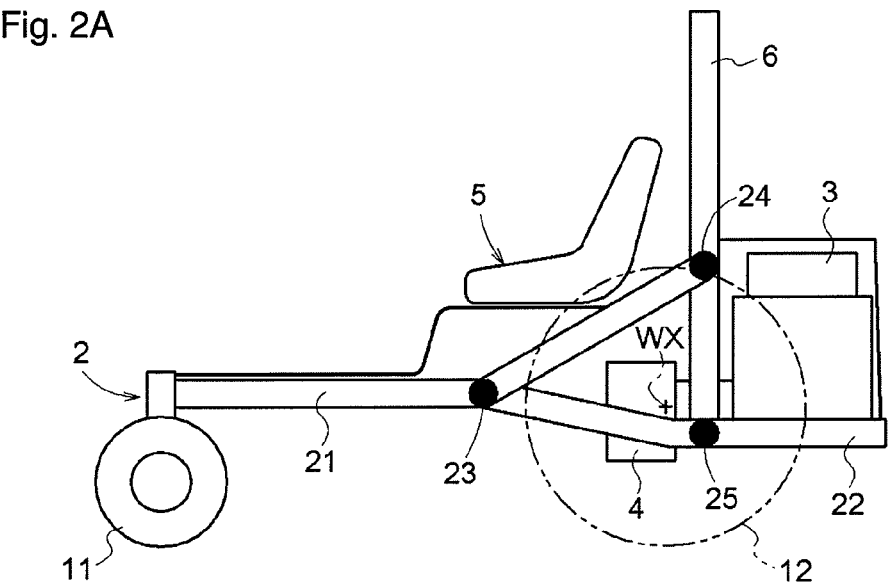
FIG. 2A is a schematic view illustrating when the front frame and the rear frame which make up the vehicle frame are coupled together.
Figure 2B:
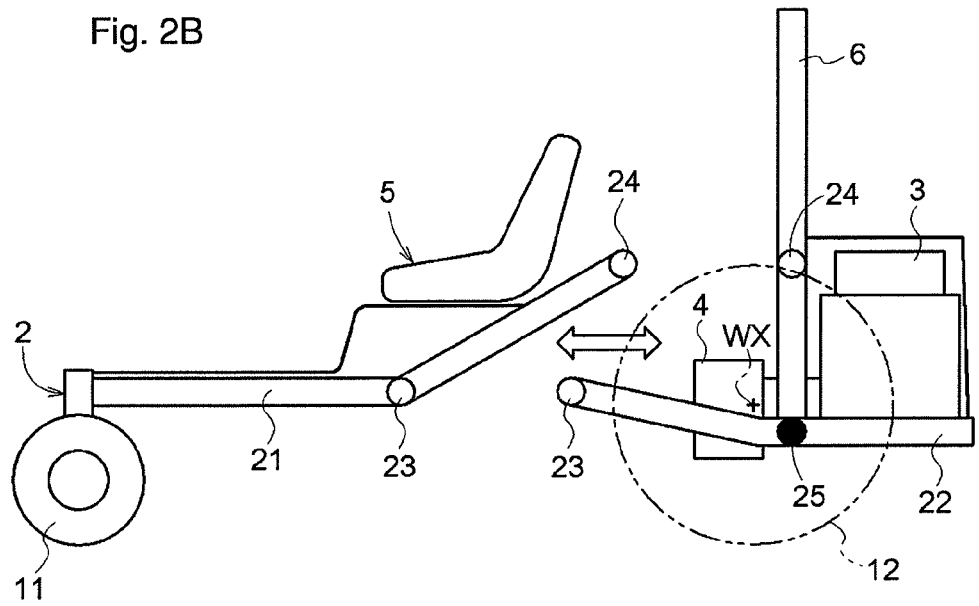
FIG. 2B is a schematic view illustrating when the front frame and the rear frame are decoupled.

When the connection structure adopted for the first coupling part 23, the second coupling part 24, and the third coupling part 25 allow an attachable and detachable connection for at least the first coupling part 23 and the second coupling part 24, the front frames 21 may be separated from the rear frames 22 and the ROPS 6. This separated state is schematically illustrated in FIG. 2. While the riding mower is in the normal configuration illustrated in FIG. 2A, the riding mower may be separated into a front half and a rear half by releasing a coupling for the first coupling part 23 and the second coupling part 24, and further appropriately manipulating a mounting component, such as an operation cable and the like, straddling the front frames 21 and the rear frames 22. As illustrated in FIG. 2A, for practical purposes, the front half of the riding mower may be configured from the front frames 21, the front wheels 11, and the operating unit 5, and the rear half thereof may be configured from the rear frames 22, the rear wheels 12, the engine 3, the transmission 4, and the ROPS 6. The ROPS 6 can also be removed from the rear frames 22 when the third coupling part 25 is given an attachable and removable connection structure. Separating the front half and the rear half of the riding mower particularly facilitates maintenance and inspection of the engine 3, the transmission 4, and the like.

Figure 3:
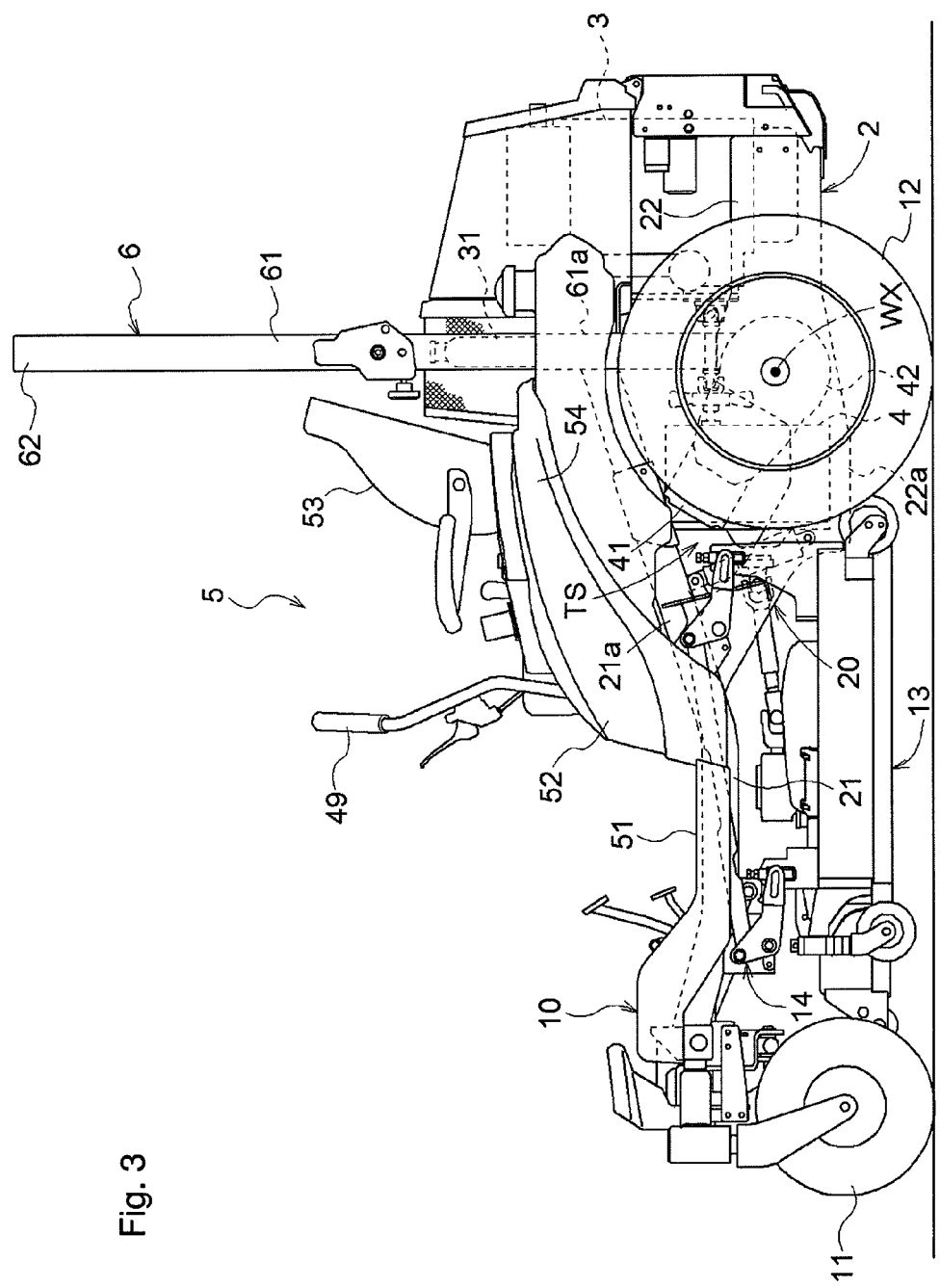
FIG. 3 is a side view of a zero turn mower according to an embodiment of the present invention.
Figure 4:
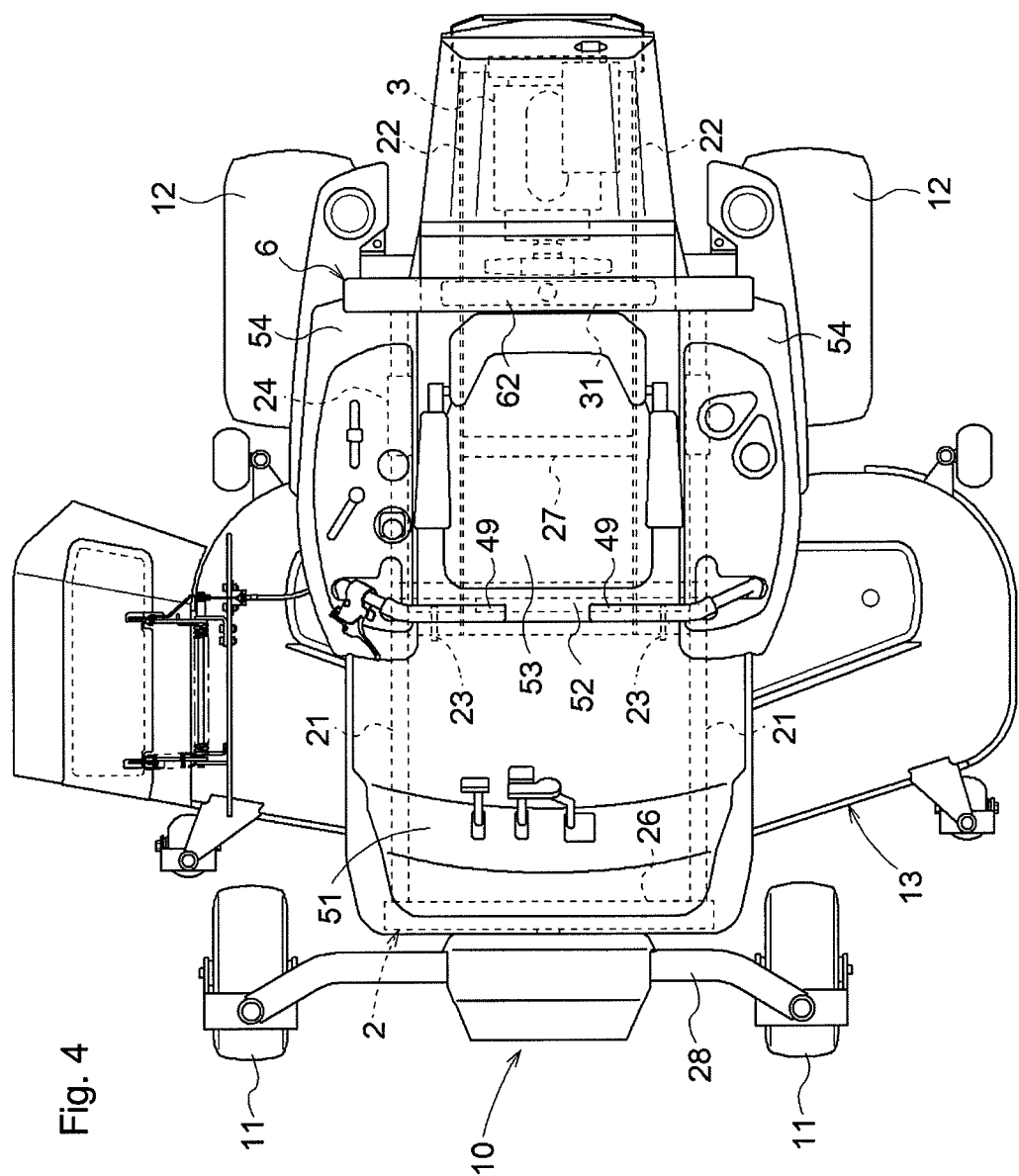
FIG. 4 is a plan view of the zero-turn mower.

Next, an embodiment of a riding mower according to the present invention is described in detail. FIG. 3 is a side view of a mower known as a zero-turn mower and is one example of a riding mower with FIG. 4 showing a plan view. As illustrated in FIGS. 3 and 4, the mower is provided with a traveling vehicle body 10 which is supported on the ground by the pair of left and right front wheels 11 and the pair of left and right rear wheels 12 as the rotationally driven traveling wheels. The traveling vehicle body 10 includes the vehicle frame 2 as a base member, and the mower unit 13 is suspended from the vehicle frame 2 between the front wheels 11 and the rear wheels 12 via a linking mechanism 14. The operating unit 5 is arranged in the center region of the traveling vehicle body 10 in the longitudinal direction of the vehicle body. Therefore, a seat support 52 is formed in the center region of the traveling vehicle body 10 in the longitudinal direction of the vehicle body and a driver's seat 53 is provided on the top surface of the seat support 52. Further, fenders 54 are formed on the left and right side surfaces of the seat support 52. Finally, a step 51 is located in front of the driver's seat 53.

The ROPS 6 is provided at the rear part of the operating unit 5. The engine 3 is arranged at the rear end region of the traveling vehicle body 10, and the transmission 4 is arranged in front of the engine 3. The transmission 4 includes a pair of left and right rear-axle transmission units 41. The left and right rear-axle transmission units 41 each have a built-in hydrostatic transmission (HST) mechanism, one example of a continuously variable transmission, which may each be operated independently. The hydrostatic transmission continuously varies the speed from low to high while the engine output is in normal rotation (forward), or reverse rotation (backward) and transmits the power of the engine to each of the rear wheels 12. Hereby, both the left and the right rear wheels 12 may be driven in a forward direction at the same or substantially the same speed to initiate traveling forward, and both the left and the right rear wheels 12 may be driven in a backward direction at the same or substantially the same speed to initiate traveling backwards. The traveling vehicle body 10 may be made to turn in an arbitrary direction by ensuring the speed of the left and the right rear wheels 12 are different from each other; for example, operating one of the left and the right rear wheels 12 at a low speed near zero and operating the other of the rear wheels 12 forward or backward at a high speed would cause the traveling vehicle body 10 to make a small radius turn. Additionally, driving the left and the right rear wheels 12 in directions opposite from each other would cause the traveling vehicle body 10 to perform a spinning turn about a turning center that is substantially the center portion between the left and right rear wheels 12. The pair of left and right front wheels 11 are configured by caster wheels, and can change orientation freely about a vertical axis center; thus, the pair of left and right front wheels 11 are capable of adjusting the orientation of the traveling vehicle depending on the traveling direction set in accordance with the way the left and right rear wheels 12 are driven.

Speed changing in the left and right rear-axle transmission units 41 is carried out using a pair of left and right speed changing levers 49 arranged on both sides of the driver's seat 53. When the speed changing levers 49 are held at a longitudinal middle position, the continuously variable transmission is in a mid-stop; and moving the speed changing levers 49 forward or rearward from the middle position causes the rear-axle transmission unit to carry out a forward speed change, or a backward speed change respectively.

Figure 5:
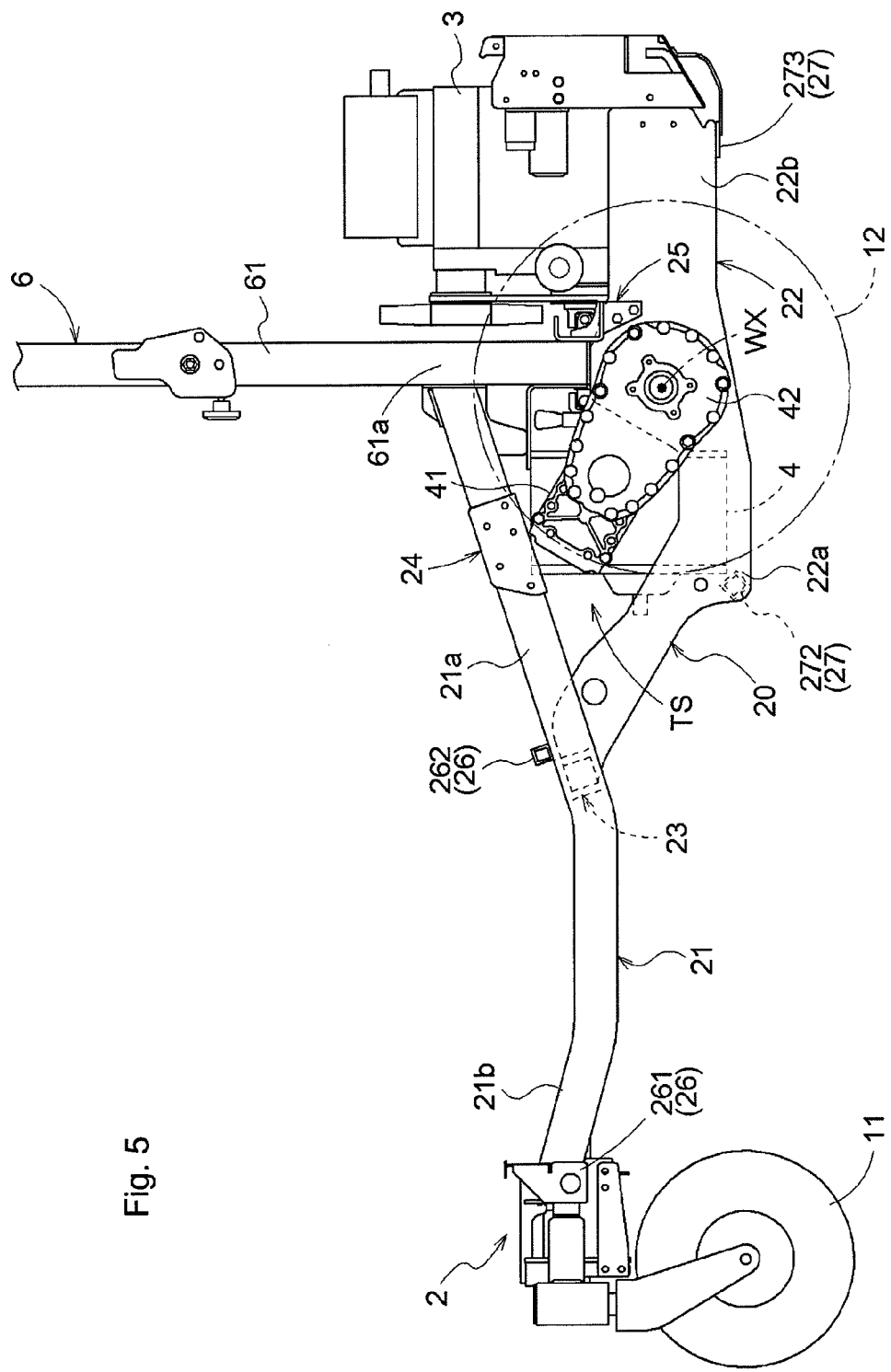
FIG. 5 is a side view illustrating the vehicle frame of the zero-turn mower.
Figure 6:
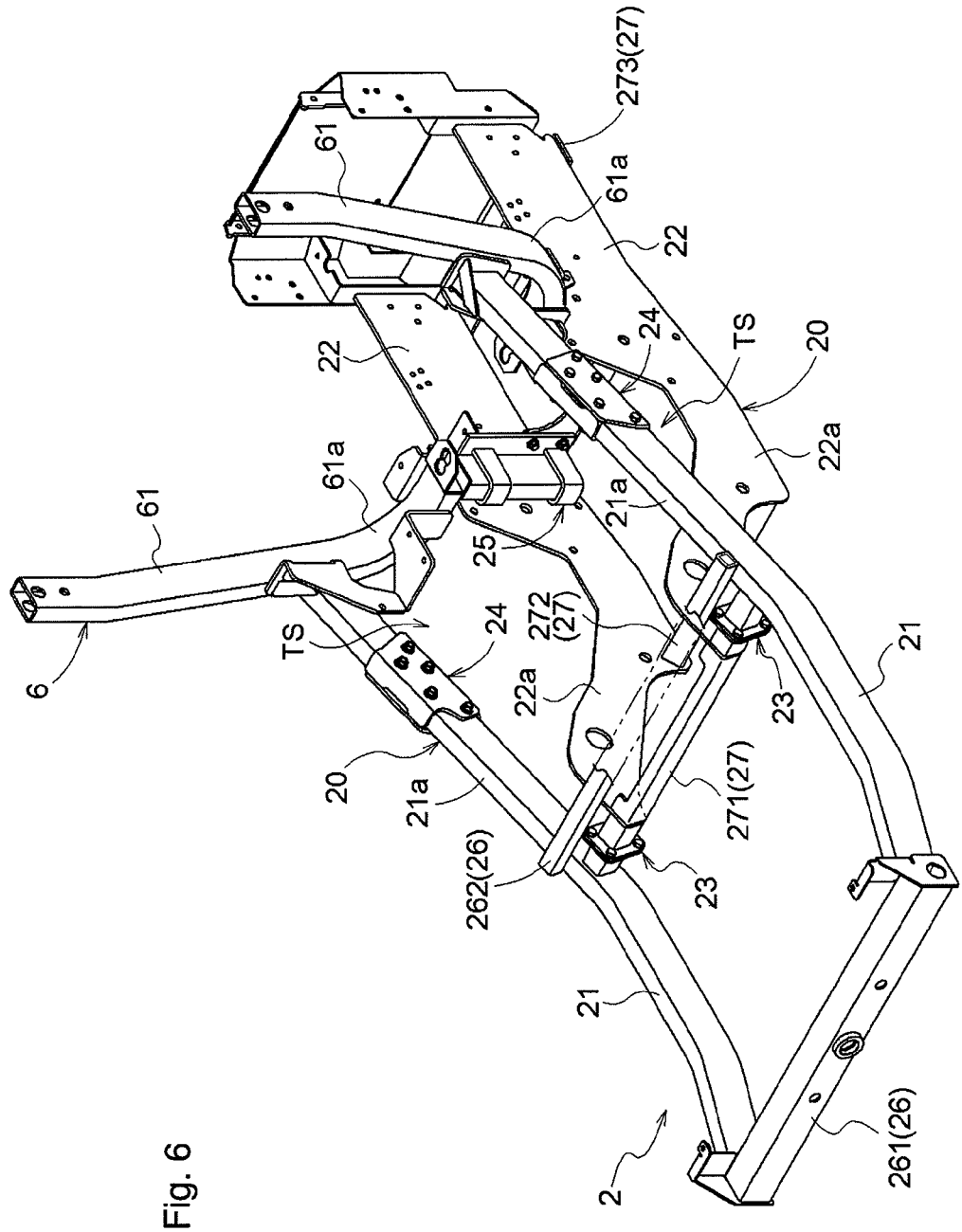
FIG. 6 is a perspective view illustrating the vehicle frame of the zero-turn mower.

As illustrated in FIG. 4 through FIG. 6, the vehicle frame 2 is configured by a pair of left and right front frames 21 and a pair of left and right rear frames 22; and the left and right front frames 21 are coupled together by a front crossbeam unit 26 configured by a plurality of crossbeams. A first crossbeam 261 and a second crossbeam 262 are illustrated in FIG. 6. The first crossbeam 261 couples the front ends of the left and right front frames 21, and the second crossbeam 262 couples the middle portions of the left and right front frames 21. Similarly, the left and right rear frames 22 are coupled together by a rear crossbeam unit 27 configured from a plurality of crossbeams. A first crossbeam 271, a second crossbeam 272, and a third crossbeam 273 are illustrated in FIG. 6. The rear portion 22b of the left and right rear frames 22 are coupled by the third crossbeam 273 which is integrated with the rear portion 22b of the rear frames 22 and forms a structural element in the engine room wherein the engine 3 is mounted.

The front portions 21b of the left and right front frames 21 angle upward toward the front. Therefore, the footrest surface of the step 51 also angles upward toward the front, and is installed in the region defined by the left and right front frames 21, and the first crossbeam 261 and the second crossbeam 262 of the front cross beam units 26. The rear portions 21a of the left and right front frames 21 are formed rising or angled upwardly toward the rear. The front portions 22a of the left and right rear frames 22 are angled upward by roughly 30° compared to the substantially horizontal rear portion 22b, as is clear from FIGS. 5 and 6. As illustrated in FIG. 5, the front end of the rear frame 22 is coupled at the middle portion of the front frame 21 by the first coupling part 23, and the front portion 22a of the rear frame 22 extend below the rear portion 21a of the front frame 21. The width between the left and right rear frames 22 is narrower than the width between the left and right front frames 21. The left and right rear frames 22 enter between the left and right front frames 21, and therefore the first coupling part 23 forms a bolted connection bracket extending in the space formed thereby to act as a bridge.

The ROPS 6 includes the left and right supporting columns 61 and a horizontal member 62 connecting the supporting columns 61. The supporting columns 61 can pivot to bend in the middle. The lower half of each supporting column 61 has a leg 61a that curves inward at substantially the same height position as the rear frame 22, extends up to arrive at the rear frame 22, and once again extends downward therefrom.

The second coupling part 24 couples the rear end of the front frame 21 and the leg 61a of the ROPS 6. The second coupling part 24 is formed as a bolted connection bracket which serves as an extending frame between the rear end of the front frame 21 and the leg 61a of the ROPS 6. The third coupling part 25 couples the lower end of the leg 61a and the inner surface of the rear frame 22. The third coupling part 25 is formed as a pocket-like bolted connection bracket that receives the lower end of the leg 61a.

Again, as described in reference to FIG. 1, and as is clear from FIGS. 5 and 6, the straight lines connecting each of the connection points at the first coupling part 23, the second coupling part 24, and the third coupling part 25 form a triangle in a side view. As a result, the rear portion 21a of the front frame 21, the leg 61a, and the front portion 22a of the rear frame 22 form a triangular structural element 20 shaped as a triangle in a side view on the left side and the right side of the vehicle frame 2. Furthermore, the left and right rear-axle transmission units 41 pass through and outward past the opening TS formed inside the triangular structural element 20; and rear-axle coupling units 42 formed on the outer ends of the rear-axle transmission units 41 are coupled to be able to transmit the power outside the vehicle frame 2 to the rear wheels 12.

As is clear from FIG. 5, the rear-axle transmission unit 41 protrudes past the opening TS in the triangular structural element 20, and extends rearward and downward. The rear axle WX or center axis of the rear wheels 12 is located rearward and downward from the opening TS in a side view.

The first coupling part 23, the second coupling part 24, and the third coupling part 25 are all bolted connections, therefore, as explained using FIG. 2, the front frames 21, the rear frames 22, and the ROPS 6 in this embodiment are also each separable.

Figure 7A:
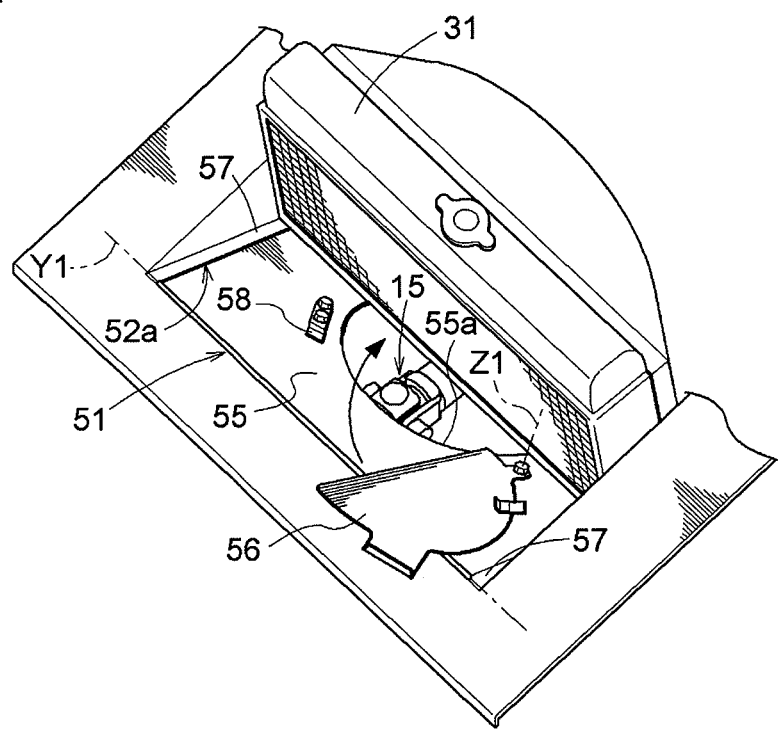
FIGS. 7A and 7B are perspective views of a maintenance plate unit of the zero-turn mower.
Figure 7B:
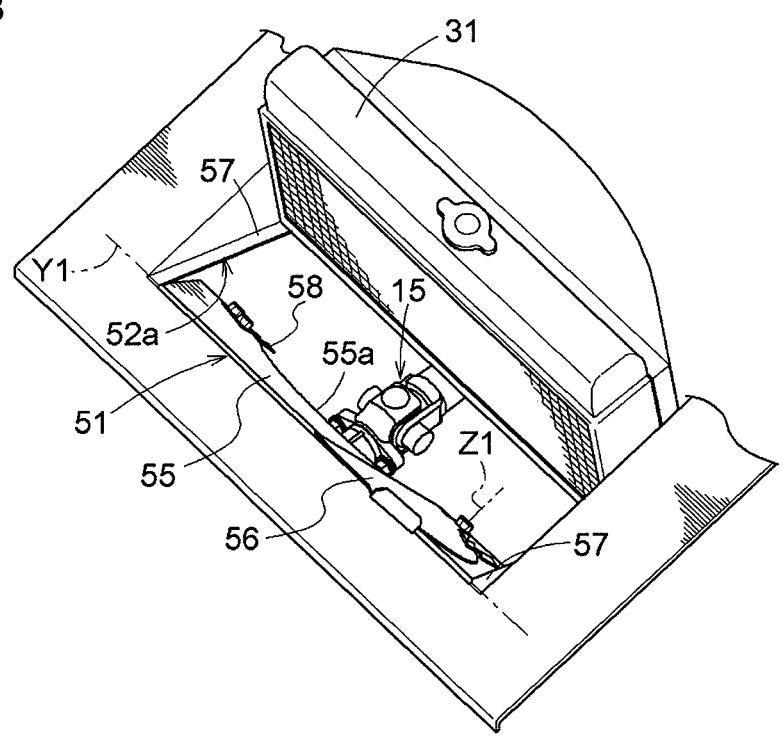

FIGS. 7A and 7B illustrate a maintenance plate unit 51 that may open and close to cover a maintenance opening 52a formed in the rear portion of the top surface of the seat support 52. The maintenance opening 52a is located above the transmission 4 toward the front of a radiator 31 arranged toward the front of the engine 3. In addition, a universal joint 15 is positioned above the transmission 4 to be accessible from the maintenance opening 52a, the universal joint 15 coupling a transmission shaft to the mower unit 13, and the transmission shaft transmitting the power from the engine.

The maintenance plate unit 51 is configured from a rectangular first plate 55 being able to open and close to cover the maintenance opening 52a; and a semi-circular second plate 56 being able to open and close to cover a semi-circular notch 55a formed in the first plate 55. The first plate 55 is able to pivot about a horizontal swing axis center Y1 between a closed position that closes the maintenance opening 52a, and an open position that opens the maintenance opening 52a. The first plate 55 may be biased in a direction of the closed position by a biasing piece or element (not shown), and held in the closed position by a first stopper 57. The second plate 56 is able to pivot about a vertical swing axis center Z1 between a closed position that closes off the notch 55a provided on the first plate 55, and an open position that opens the maintenance opening 52a. The second plate 56 is biased in a direction of the closed position by a biasing piece or element (not shown), and held in the closed position by a second stopper 58. Moreover, the notch 55a is formed so that when the first plate 55 pivots to the open position, the universal joint 15 moves past the notch 55a in the first plate 55. This secures a large pivoting angle for the first plate 55, and facilitates expelling cut grass collected around the radiator downward. Furthermore, a repair person can also grease the universal joint 15 and the like through the open notch 55a even with the first plate 55 in the closed position by pivoting the second plate 56 to the open position.

Figure 8:
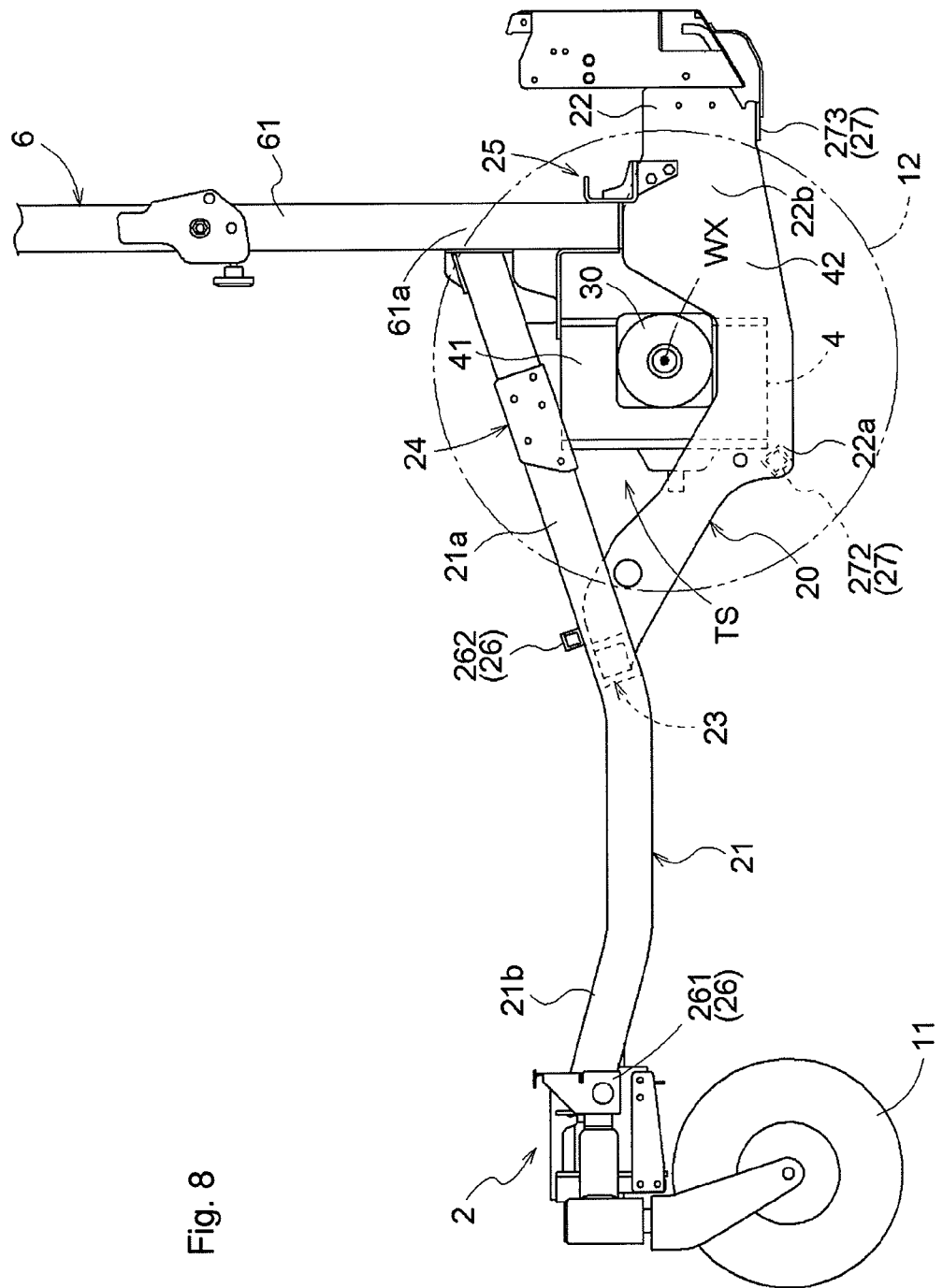
FIG. 8 is a plan view illustrating a sliding front-wheel support mechanism in a zero-turn mower adopting an electric motor in the drive unit thereof.

Other Non-Limiting Embodiments (1) The above described embodiments adopt an engine 3 and a transmission 4 including a hydrostatic transmission (HST) to serve as the drive unit. In a different embodiment, an electric motor may be used in place of the engine 3. The HST may be excluded when an electric motor is adopted, and a vehicle steering may be used. Additionally, as illustrated in FIG. 8, a configuration may be adopted where the left and right rear wheels 12 are individually driven by the electric motor 30. In that case, as illustrated in FIG. 8, the electric motor 30 may be supported on the triangular structural element 20, where at least a portion of the electric motor 30 is stored inside the opening TS in the triangular structural element 20 to ensure that the vehicle is compact. The output shaft center of the electric motor 30 may be located inside the opening TS in the triangular structural element 20. The output shaft for the electric motor 30 may also configure the rear axle WX. Finally, the electric motor 30 may also be a wheel motor built into the rear wheels 12.

(2) In the above described embodiments, the first coupling part 23, the second coupling part 24, and the third coupling part 25 are all bolted connections; however, these coupling parts may also be welded, (or the like) in order to prevent separation. The strength of the vehicle frame 2 through the triangular structural element 20 would thereby be further reinforced.

(3) The above described embodiments adopt a configuration where the mower unit 13 is mid-mounted, i.e., arranged between the front wheels 11 and the rear wheels 12. However, a configuration may be adopted where the mower unit 13 is front-mounted, i.e., arranged in front of the front wheels 11.

(4) The front wheels 11 are configured by caster wheels in the above described embodiments; however the front wheels may be configured by steered wheels that may be handled via a steering wheel. When the front wheels are steered wheels, a differential mechanism branches the output from the same speed change device, and the left and right rear wheels receive the output from the speed change device via the differential mechanism.

Figure 9:
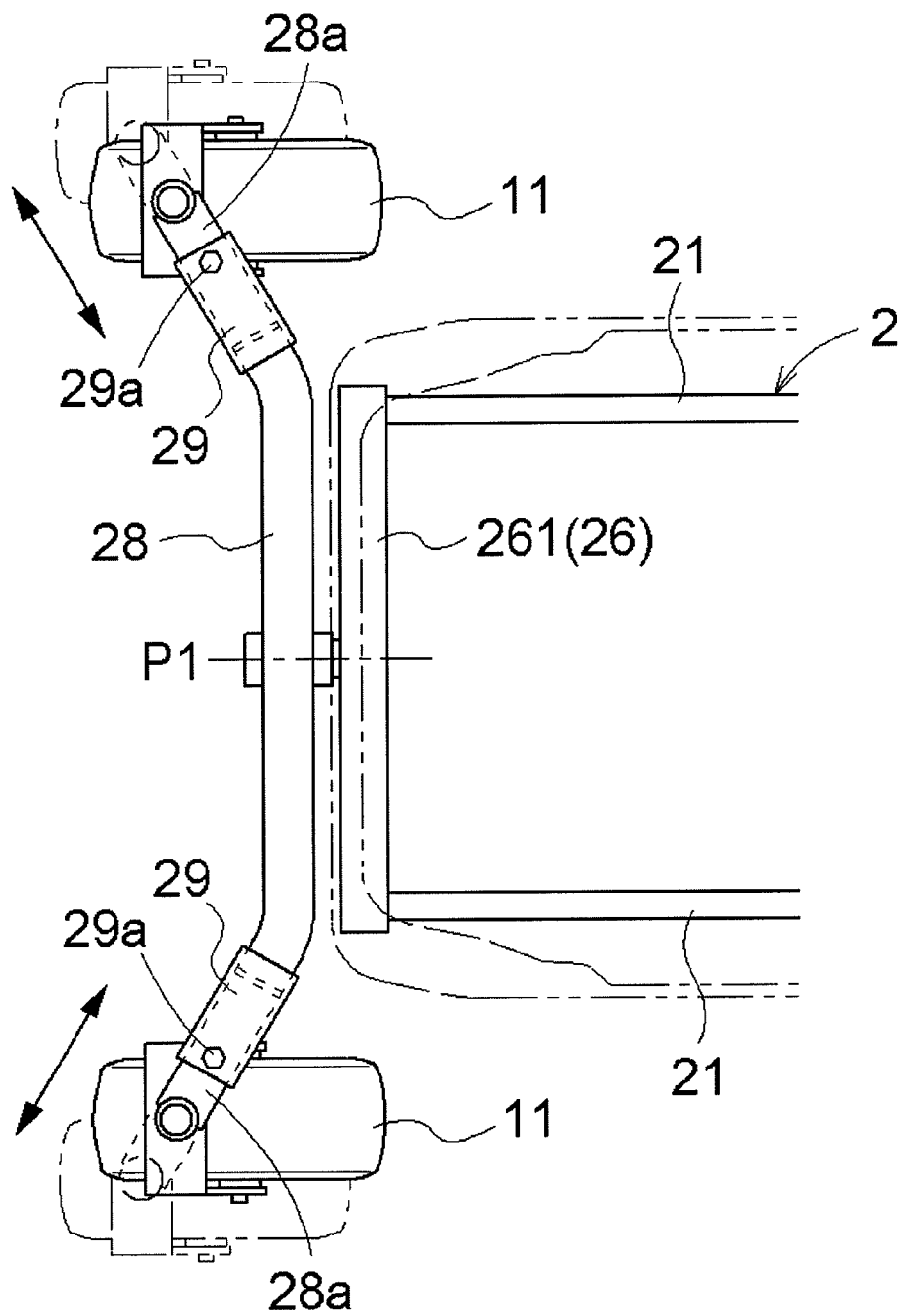
FIG. 9 is a plan view illustrating a sliding front-wheel support mechanism in another embodiment.

(5) In the above described embodiments, the left and right front wheels 11 are attached to a front-wheel support arm 28 provided on the front end of the vehicle frame 2. FIG. 9 illustrates a different embodiment where the front wheels 11 are attached via a sliding front-wheel support mechanism. Here, the front-wheel support arm 28, with left and right tip-end portions 28a thereof angled forward, is attached to pivot about a swing axis center P1 provided extending lengthwise along the vehicle body at the center of the first crossbeam 261. At least the tip-end portions 28a on both sides of the front-wheel support arm 28 extend in a straight line along the central axis center, and the tip-end portions 28a are equipped with sleeves 29 capable of sliding along the central axis. The front wheels 11 are attached to these sleeves 29. The sleeves 29 are secured at a predetermined location along the sliding stroke by a fitting pin 29a. Thus, adjusting the sliding of the sleeve 29 adjusts the tread of the front wheels 11. In addition to adopting the features of this embodiment, the first coupling part 23, the second coupling part 24, and the third coupling part 25 are preferably configured with a structure adjustable lengthwise along the vehicle body, to make it possible to adjust the spacing between the front wheels 11 and the rear wheels 12.

The present invention may be adopted in riding mowers equipped with a vehicle frame extending lengthwise along the vehicle body.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A riding mower comprising:
    a pair of left and right front frames extending lengthwise along the vehicle body;
    a pair of left and right rear frames extending rearward from the front frames lengthwise along the vehicle body;
    a rollover protective structure including a pair of left and right supporting columns;
    a pair of left and right front wheels coupled to the front frames;
    a pair of left and right rear wheels coupled to the rear frames;
    an operating unit;
    a drive unit mounted in an area of the rear frames;
    at least one first coupling part coupling one front frame and one rear frame;
    at least one second coupling part coupling the one front frame and one supporting column;
    at least one third coupling part coupling the one supporting column and the one rear frame,
    wherein said first, second and third coupling parts define portions of at least one structural element that is triangular shaped or defines a triangular shaped opening and includes:
        a portion on the one front frame extending to at least the first coupling part;
        a portion on the one supporting column extending to at least the second coupling part; and
        a portion on the one rear frame extending to at least the third coupling part.

2. The riding mower according to claim 1, wherein said structural element includes:
    the portion on the one front frame extending between the first coupling part and the second coupling part;
    the portion on the one supporting column extending between the second coupling part and the third coupling part; and
    the portion on the one rear frame extending between the third coupling part and the first coupling part.

3. The riding mower according to claim 1, wherein the front frames and the rear frames are separable by decoupling said first coupling part and said second coupling part.

4. The riding mower according to claim 1, wherein at least a portion of the rear frames is located below the front frames.

5. The riding mower according to claim 1, wherein the drive unit comprises an engine and a transmission.

6. The riding mower according to claim 1, wherein the drive unit comprises an electric motor unit.

7. The riding mower according to claim 6, wherein the electric motor unit includes a pair of left and right electric motors that drive the rear wheels.

8. The riding mower according to claim 7, wherein one of the electric motors is supported on said structural element, and the rotational axis center of the one electric motor passes through an opening in said structural element.

9. The riding mower according to claim 1, wherein said structural element is triangular shaped and includes:
    the portion on the one front frame extending between the first coupling part and the second coupling part;

the portion on the one supporting column extending between the second coupling part and the third coupling part; and the portion on the one rear frame extending between the third coupling part and the first coupling part, wherein the second coupling part is located at a position that is above the first coupling part.

10. A riding mower comprising:
a pair of left and right front frames extending lengthwise along the vehicle body;
a front frame crossbeam unit coupling the front frames;
a pair of left and right rear frames extending rearward from the front frames lengthwise along the vehicle body;
a rear frame crossbeam unit coupling the rear frames;
a rollover protective structure including a pair of left and right supporting columns;
a pair of left and right front wheels;
a pair of left and right rear wheels;
an operating unit;
a drive unit mounted on the rear frames;
a first coupling part coupling a portion of one front frame and a portion of one rear frame;
a second coupling part coupling another portion of the one front frame and a portion of one supporting column;
a third coupling part coupling another portion of the one supporting column and another portion of the one rear frame,
wherein said first, second and third coupling parts define portions of at least one triangular shaped structural element that defines a triangular shaped opening and includes:
  a section of the one front frame extending between the first coupling part and the second coupling part;
  a section of the one supporting column extending between the second coupling part and the third coupling part; and
  a section of the one rear frame extending between the third coupling part and the first coupling part.

11. The riding mower according to claim 10, wherein the front frames and the rear frames are separable by decoupling the first coupling part and the second coupling part.

12. The riding mower according to claim 10, wherein at least a portion of the rear frames is located below the front frames.

13. The riding mower according to claim 10, wherein the drive unit comprises an engine and a transmission.

14. The riding mower according to claim 10, wherein the drive unit comprises one of:
  an electric motor unit; and
  a pair of left and right electric motors that drive the rear wheels.

15. The riding mower according to claim 10, wherein the second coupling part is located at a position that is above the first coupling part and the third coupling part is located at a position that is below the first coupling part.

16. A riding mower comprising:
a pair of left and right front frames extending lengthwise along the vehicle body;
a pair of left and right rear frames extending rearward from the front frames lengthwise along the vehicle body;
a rollover protective structure including a pair of left and right supporting columns;
a pair of left and right front wheels;
a pair of left and right rear wheels;
an operating unit;
a drive unit mounted on the rear frames;
a first coupling part coupling together a portion of one front frame and a portion of one rear frame;
a second coupling part coupling together another portion of the one front frame and a portion of one supporting column;
a third coupling part coupling together another portion of the one supporting column and another portion of the one rear frame,
wherein said first, second and third coupling parts define portions of at least one structural element that defines a triangular shaped opening and includes:
  a section of the one front frame located between the first coupling part and the second coupling part;
  a section of the one supporting column located between the second coupling part and the third coupling part; and
  a section of the one rear frame located between the third coupling part and the first coupling part.

17. The riding mower according to claim 16, wherein decoupling the first coupling part and the second coupling part allows separation of the front frames from the rear frames.

18. The riding mower according to claim 16, wherein at least a portion of the rear frames is located below the front frames.

19. The riding mower according to claim 16, wherein the drive unit comprises an engine and a transmission.

20. The riding mower according to claim 16, wherein the drive unit comprises an electric motor unit.

21. The riding mower according to claim 20, wherein the electric motor unit includes a pair of left and right electric motors that drive the rear wheels.

22. The riding mower according to claim 21, wherein one electric motor is supported on said structural element, and a rotational or center axis of the electric motor extends through an opening in said structural element.

23. The riding mower according to claim 16, wherein the second coupling part is located at a position that is above the first coupling part and the other portion of the one front frame coupled to the portion of one supporting column via the second coupling part is an angled frame section.

* * * * *